United States Patent
Bamford et al.

(10) Patent No.: US 10,293,542 B2
(45) Date of Patent: May 21, 2019

(54) SLIPPER TOOL, SYSTEM AND METHOD FOR USING THE SLIPPER TOOL FOR MOLDING

(71) Applicant: GLOBE MACHINE MANUFACTURING COMPANY, Tacoma, WA (US)

(72) Inventors: Calvin D. Bamford, Tacoma, WA (US); Ronald Marvin Jacobsen, Puyallup, WA (US); James Patrick Martin, Troy, NY (US)

(73) Assignee: GLOBE MACHINE MANUFACTURING COMPANY, Tacoma, WA (US)

( * ) Notice: Subject to any disclaimer, the term of this patent is extended or adjusted under 35 U.S.C. 154(b) by 708 days.

(21) Appl. No.: 14/754,086

(22) Filed: Jun. 29, 2015

(65) Prior Publication Data

US 2015/0375444 A1    Dec. 31, 2015

Related U.S. Application Data

(60) Provisional application No. 62/018,384, filed on Jun. 27, 2014.

(51) Int. Cl.
*B29C 43/52* (2006.01)
*B29C 43/58* (2006.01)
(Continued)

(52) U.S. Cl.
CPC ............ *B29C 51/421* (2013.01); *B29C 43/04* (2013.01); *B29C 43/52* (2013.01); *B29C 51/18* (2013.01);
(Continued)

(58) Field of Classification Search
CPC ....... B29C 51/18; B29C 70/54; B29C 70/465; B29C 51/46; B29C 51/421; B29C 51/30;
(Continued)

(56) References Cited

U.S. PATENT DOCUMENTS 5,139,407 A    8/1992  Kim et al.
6,015,512 A    1/2000  Yang et al.
(Continued)

FOREIGN PATENT DOCUMENTS

EP    0473422 A1    3/1992
WO    2008094124 A1    8/2008

OTHER PUBLICATIONS

International Search Report dated Oct. 13, 2015 in International Application No. PCT/US2015/038371, filed Jun. 29, 2015.
(Continued)

*Primary Examiner* — Joseph S Del Sole
*Assistant Examiner* — Thu Khanh T Nguyen
(74) *Attorney, Agent, or Firm* — Hauptman Ham, LLP

(57) ABSTRACT

A system includes a press, an external heater and a slipper tool. The press is moveable between an open position and a closed position, and has a mold tool. The external heater is located outside the press. The slipper tool is moveable between the external heater and a mold space of the press when the press is in an open position. The slipper tool has a surface configured to receive thereon a material of a product to be molded. The surface corresponds to a molded surface of the product. When the slipper tool is at the external heater, the external heater is configured to heat the material received on the slipper tool. When the slipper tool is in the mold space and the press is in a closed position, the mold tool is configured to press the heated material against the surface of the slipper tool to mold the product.

20 Claims, 7 Drawing Sheets

(51) Int. Cl.
  *B29C 51/42* (2006.01)
  *B29C 51/18* (2006.01)
  *B29C 51/26* (2006.01)
  *B29C 51/30* (2006.01)
  *B29C 51/46* (2006.01)
  *B29C 70/34* (2006.01)
  *B29C 70/46* (2006.01)
  *B29C 70/54* (2006.01)
  *B29C 43/04* (2006.01)
  *B29K 77/00* (2006.01)
  *B29K 307/04* (2006.01)

(52) U.S. Cl.
  CPC ............ *B29C 51/261* (2013.01); *B29C 51/30* (2013.01); *B29C 51/46* (2013.01); *B29C 70/345* (2013.01); *B29C 70/465* (2013.01); *B29C 70/54* (2013.01); *B29C 2043/046* (2013.01); *B29K 2077/00* (2013.01); *B29K 2307/04* (2013.01)

(58) Field of Classification Search
  CPC ..... B29C 51/261; B29C 70/345; B29C 43/04; B29C 43/52; B29C 2043/046; B29K 2077/00
  USPC .......................... 425/346, 352–355, 407–432
  See application file for complete search history.

(56) References Cited

U.S. PATENT DOCUMENTS

| | | | |
|---|---|---|---|
| 6,171,419 B1 | 1/2001 | Heiman et al. | |
| 7,556,492 B2* | 7/2009 | Waatti | B29C 33/02 425/407 |
| 8,650,745 B2* | 2/2014 | Jacobsen | B29C 35/02 264/101 |

OTHER PUBLICATIONS

Written Opinion dated Oct. 13, 2015 in International Application No. PCT/US2015/038371, filed Jun. 29, 2015.

* cited by examiner

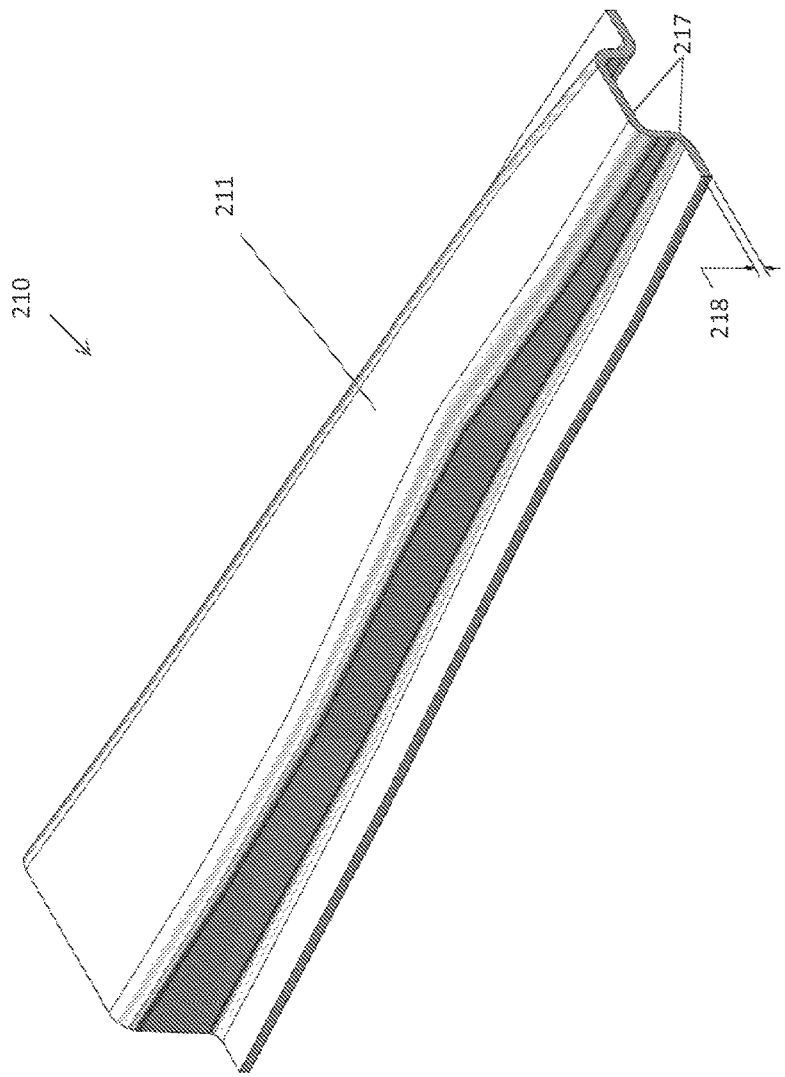

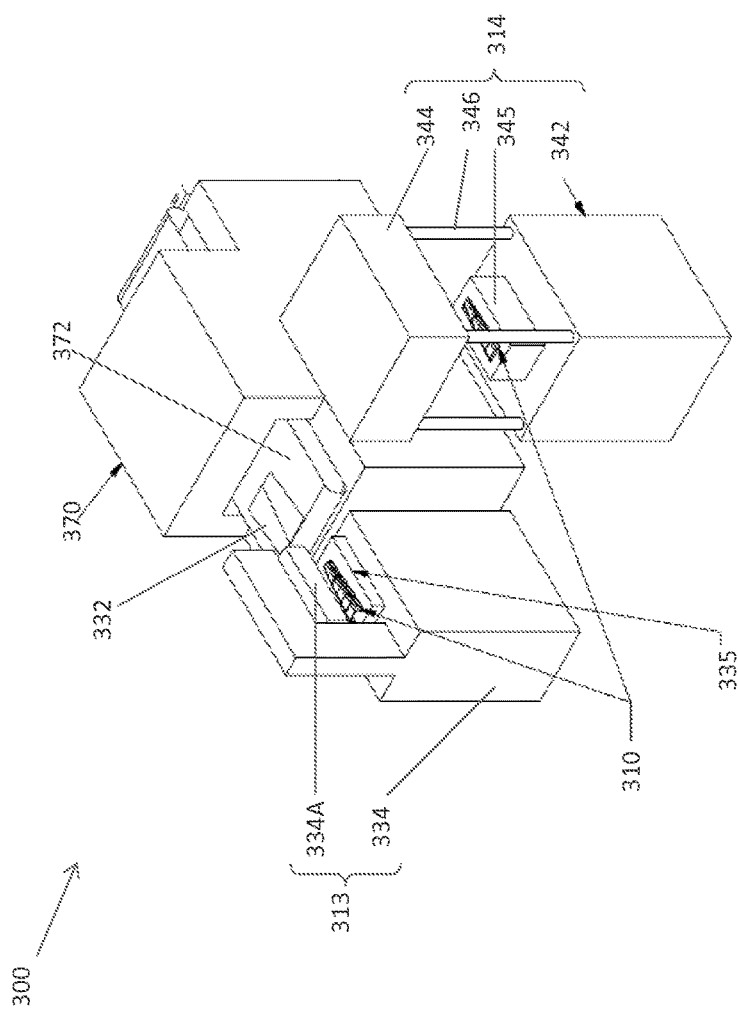

SLIPPER TOOL, SYSTEM AND METHOD FOR USING THE SLIPPER TOOL FOR MOLDING

RELATED APPLICATIONS

The instant application claims priority from U.S. Provisional Patent Application No. 62/018,384, filed Jun. 27, 2014, which is hereby incorporated herein by reference in its entirety. The instant application is also related to U.S. Pat. No. 8,650,745 which is incorporated by reference in its entirety herein.

TECHNICAL FIELD

The disclosure is related to a slipper tool, a system and a method for using the slipper tool for molding products. In some aspects, the disclosure is related to a slipper tool, a system and a method for using the slipper tool for molding products from thermoplastic materials, laminates or other materials that are mechanically difficult to handle in softened or molten states.

BRIEF DESCRIPTION OF THE DRAWING

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIG. 2 is a perspective view of a slipper tool in accordance with some embodiments.

FIG. 3A is a perspective view of a molding system in accordance with some embodiments.

DETAILED DESCRIPTION

Figure 1:
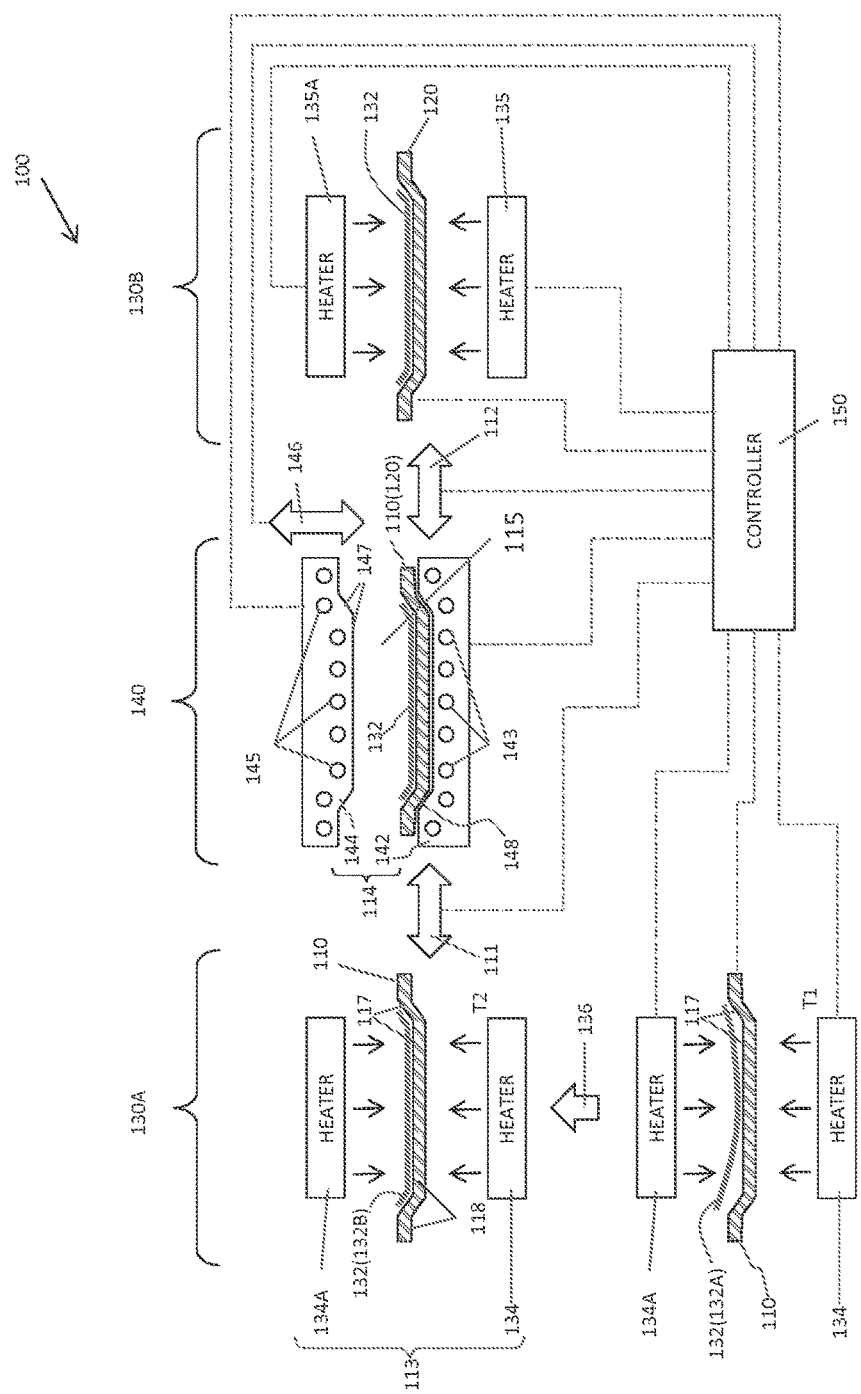
FIG. 1 is a schematic view of a molding system using at least one slipper tool in accordance with some embodiments.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

In some embodiments, a slipper tool receives a material of a product to be molded and is heated outside a press. When the heated material conforms in shape to a surface of the slipper tool, the slipper tool and the heated material are transferred to the press for molding with a mold tool. As a result, in at least one embodiment, a need to directly handle a hot, sticky, or fragile heated material is eliminated and/or reduced. In some embodiments, it is easier and quicker to heat up or cool down the slipper tool than to heat up or cool down the mold tool (which has a much higher mass) in the press. As a result, in at least one embodiment, one or more effects such as shortened molding time, improved product quality and/or production rate is/are obtainable.

FIG. 1 is a schematic view of a molding system 100 using at least one slipper tool 110 in accordance with some embodiments. The molding system 100 further comprises an external heater 113 and a press 114. The press 114, as described herein with respect to one or more embodiments, is movable between an open position, in which a mold space 115 in the press 114 is accessible from outside, and a closed position, in which the mold space 115 in the press 114 is closed. The external heater 113 is located outside the press 114. The at least one slipper tool 110 is moveable between the external heater 113 and the mold space 115 when the press 114 is in the open position. The slipper tool 110, as described herein with respect to one or more embodiments, comprises a surface configured to receive thereon a material of a product to be molded and corresponding to a molded surface of the product. In particular, in one or more embodiments, when the slipper tool 110 is at the external heater 113, the external heater 113 is configured to heat the material received on the slipper tool 110. When the slipper tool 110 is in the mold space 115 and the press 114 is in the closed position, a mold tool of the press 114 is configured to press the heated material against the surface of the slipper tool 110 to mold the product.

The molding system 100 includes at least two main areas, including a work station (also referred to in one or more embodiments as "layup station") 130A in which the external heater 113 is arranged, and a processing station 140 in which the press 114 is arranged. The slipper tool 110 is moveable between the work station 130A and the processing station 140 as shown by arrow 111 which schematically indicates a transferring arrangement for transferring the slipper tool 110 between the work station 130A and the processing station 140. Although it is not excluded in at least one embodiment to manually transfer the slipper tool 110 between the work station 130A and the processing station 140, the molding system 100 in accordance with some embodiments comprise a device for transferring the slipper tool 110 without manual handling of the slipper tool 110 by a human operator. Examples of such a device for transferring the slipper tool 110 include, but are not limited to, a robot hand, conveyor belt, chain conveyor etc.

In the example configuration in FIG. 1, the molding system 100 includes a further work station 130B in which a further external heater is arranged. A further slipper tool 120 is moveable between the further work station 130B and the processing station 140 as shown by arrow 112 which schematically indicates a transferring arrangement. In at least one embodiment, the further slipper tool 120, the work station 130B with the external heater arranged herein, and the transferring arrangement 112 are configured in a manner similar to the slipper tool 110, the work station 130A with the external heater 113 arranged herein, and the transferring device 111. In at least one embodiment, the work station 130B and/or the further slipper tool 120 is omitted. In at least one embodiment, the number of work stations, such as 130A, 130B, and/or the number of slipper tools, such as 110, 120, is/are not limited to the example configurations illustrated in or described with respect to FIG. 1. For example, more than two work stations and/or more than two slipper tools are included in a molding system in accordance with some embodiments. For another example, the number of work stations in a molding system in accordance with some embodiments is different from the number of slipper tools in the molding system.

The molding system 100 further includes a controller 150 coupled to other components of the slipper tool 110 and configured to control one or more of the operations as described herein.

The slipper tool 110 includes a thermal conductive material and is utilized as a carrier to transfer a material from one process (e.g., the work station 130A) to a subsequent process (e.g., the processing station 140). The shape, dimensions and/or surface preparation (generally indicated as 117 in FIG. 1) of the slipper tool 110 are of the design of a final molded surface of the product to be molded. The shape, dimensions and/or surface preparation (generally indicated as 147 in FIG. 1) of a mold tool, e.g., 144, of the press 114 are of the design of an opposite, molded surface of the product to be molded. In at least one embodiment, the curvature of the slipper tool 110 is positive or negative relative to the mold tool 144. In at least one embodiment, the material to be molded is draped over a positive curvature (e.g., a convex portion) of the slipper tool 110 to be contacted by the negative or female side (e.g., a concave portion) of the mold tool 144. Alternatively, in at least one embodiment, the material is draped into a negative curvature (e.g., a concave portion) of the slipper tool 110 to be contacted by the positive or male side (e.g., a convex portion) of the mold tool 144, as shown and described with respect to FIG. 1. In at least one embodiment, a final application will dictate the geometry orientation for transfer and molding.

The slipper tool 110 incorporates, in one or more embodiments, features configured for alignment and/or positioning of the material to be molded, and/or geometric details and/or identification markings to become evident at the final molded product. Example features include, but are not limited to, holes, pins, shear walls, pattern embossing, and laser etched characters. The slipper tool 110 also incorporates, in one or more embodiments, one or more handling features to facilitate transfer of the slipper tool 110 throughout the manufacturing processes. Example handling features include, but are not limited to, tabs to be gripped, handles, and attachment points for chain conveyors. In at least one embodiment, the slipper tool 110 further includes an internal heater, such as, a resistive heater. In at least one embodiment, the slipper tool 110 is free of any active heating and/or cooling elements.

At the work station 130A, a material 132 (also referred to herein as "raw material") of the product to be molded is assembled inside the slipper tool 110 and is heated by the external heater 113. Examples of the material 132 include, but are not limited to, thermoplastic polymers, thermoplastic polymeric matrix composites, thermoplastic polymeric resins, thermosetting polymers, thermosetting polymeric matrix composites, thermosetting polymeric resins, or other materials that are mechanically difficult to handle in uncured, softened and/or molten states. In at least one embodiment, the external heater 113 comprises one or more heaters, such as a lower heater 134, and an upper heater 134A. The upper heater 134A directly heats the material 132. The lower heater 134 heats the material 132 via the slipper tool 110. In some embodiments, either or both of the heaters 134, 134A include(s) one or more of air heating, a gas heater, an electric heater, and an infrared heater. Other heating arrangements are within the scope of various embodiments. The described number, configuration and/or arrangement of the external heater 113 are examples. Other arrangements are within the scope of various embodiments. For example, in some embodiments, one of the heaters 134, 134A is omitted. In another example, at least one of the heaters 134, 134A is/are arranged with respect to the slipper tool 110 in a direction other than the up-down direction described with respect to FIG. 1.

In at least one embodiment, the work station 130A is configured as an inspection or product removal (also referred to herein as "demolding station") for visual inspection and/or removal of the cured/molded product from the slipper tool 110 upon completion of a cure/molding cycle (also referred to herein as "molding process") as described herein. In at least one embodiment, a separate inspection or product removal station (not shown) is provided in the molding system 100. In at least one embodiment, the molding system 100 includes one or more additional stations for assembling (also referred to herein as "laying up") and heating the raw material of a further product while a product is being molded with the slipper tool 110 in the press 114. In the example configuration shown in FIG. 1, the molding system 100 comprises another work station station 130B with the corresponding slipper tool 120 and one or more heaters 135, 135A which is configured to operate similarly to the corresponding slipper tool 110 and heaters 134, 134A. The work station 130B with the corresponding heaters 135, 135A is configured for laying up and heating a raw material of a further product to be molded in the further slipper tool 120, while a product is being molded in the press 114 with the slipper tool 110. When the molding process of the product in the slipper tool 110 is complete and the slipper tool 110 is removed from the press 114 to the work station 130A (or a separate inspection or product removal station) for inspection and/or removal, the further slipper tool 120 with the heated raw material is transferred into the press 114 for a subsequent molding process. In some embodiments, the work station 130B is configured as an inspection or product removal station for the product molded using the slipper tool 110.

The processing station 140 includes the press 114 which, in turn, includes a lower mold part 142 and an upper mold part 144. The lower mold part 142 includes a cooling arrangement, such as one or more ducts 143, for cooling the product being molded from below via the slipper tool 110 (or 120) currently in the press 114. The upper mold part 144 includes a further cooling arrangement, such as one or more ducts 145, for cooling the product being molded from above. In at least one embodiment, the coolant used for cooling in the press 114 includes water. In at least one embodiment, the temperature of the water used as coolant is at or below the room temperature. The described cooling arrangement and/or coolant for the press 114 are examples. Other arrangements are within the scope of various embodiments. In some embodiments, either one or both of the lower mold part 142 and upper mold part 144 includes a heater for maintaining the temperature of the product being molded at a predetermined temperature. In at least one embodiment, the press 114 includes no heater capable of heating the raw material from a normal temperature (e.g., room temperature) to a molding temperature as described herein. In at least one embodiment, the press 114 includes a heater capable of heating the raw material from the normal temperature to the molding temperature, but such a heater is not controlled, e.g., by the controller 150, to heat the raw material from the normal temperature to the molding temperature. Instead, such a heater is controlled by the controller 150 to maintain the molding temperature achieved by an external heater and/or to reheat the raw material from a temperature slightly below the molding temperature (due to, e.g., a temperature drop during the transfer of the slipper tool from the external heater into the press), back to the molding temperature.

The lower mold part 142 and the upper mold part 144 are moveable relative to each other as shown by an arrow 146, to open and close the mold space 115 of the press 114. Example devices for opening/closing the press 114 include, but are not limited to, hydraulic cylinders, electric motors, etc. In at least one embodiment, a sealing mechanism (described herein with respect to FIG. 4 in an example) is provided to seal the lower mold part 142 and the upper mold part 144 in the closed position. In the example configuration illustrated in FIG. 1, the upper mold part 144 defines a mold tool that has a convex shape 147 matching with a concave shape 117 of the slipper tool 110. The matching shapes 117, 147 of the slipper tool 110 and the upper mold part 144 define the opposite surfaces and/or shape of the molded product. In one or more embodiments, a lower side 118 of the slipper tool 110 and an upper side 148 of the lower mold part 142 have matching configurations for promoting heat transfer between the slipper tool 110 and the lower mold part 142. For example, the upper side 148 of the lower mold part 142 defines a cradle for receiving and holding the slipper tool 110 when the slipper tool 110 is transferred into the mold space 115. In one or more embodiments, the lower side 118 of the slipper tool 110 and/or the upper side 148 of the lower mold part 142 have a configuration that is complementary to the shapes 117, 147 of the slipper tool 110 and the upper mold part 144. As a result, it is possible to provide the slipper tool 110 in one or more embodiments as an add-on to a pre-existing press 114 having corresponding molding surfaces 147, 148, without changes, or redesign, to the press 114. In one or more embodiments, the lower side 118 of the slipper tool 110 and/or the upper side 148 of the lower mold part 142 do not have a configuration that is complementary to the shapes 117, 147 of the slipper tool 110 and the upper mold part 144.

The controller 150 is coupled one or more of slipper tools 110, 120, the heaters 134, 134A, 135, 135A, the lower mold part 142, the conductive segment 144, the transferring devices 111, 112 for transferring the slipper tools 110, 120 to/from the press 114, the device for closing/opening the press 114 etc. The controller 150 is further configured to control various operations in the molding system 100, including, but not limited to, heating of the material 132 in the slipper tools 110, 120 at the work stations 130A, 130B by one or more of the heaters 134, 134A, 135, 135A and/or by the internal heater of the slipper tools 110, 120, movements of the transferring devices 111, 112 for transferring the slipper tools 110, 120 between the work stations 130A, 130B and the processing station 140, cooling and/or heating of the lower mold part 142 and/or upper mold part 144, closing and opening movements of the press 114 by the corresponding closing/opening device 146 etc. In at least one embodiment, the controller 150 includes one or more of microprocessors, micro-controllers, digital signal processors, microcomputers, central processing units, field programmable gate arrays, programmable logic devices, state machines, logic circuitry, analog circuitry, digital circuitry, and/or any device that manipulates signals (analog and/or digital) based on operational instructions stored in one or more memory devices. Examples of such a memory device include, but are not limited to, read-only memory, random access memory, volatile memory, non-volatile memory, static memory, dynamic memory, flash memory, and/or any device that stores information.

The operation of the molding system 100 in accordance with some embodiments is as follows.

First, the material 132 is assembled inside the slipper tool 110, and the heater 134/134A begins to heat the material 132 at a first heating stage with a first temperature T1. The material 132 initially has a shape 132A not necessarily conforming to the shape 117 of the slipper tool 110. As the heating continues, the material 132 is softened (or molten in some embodiments), and becomes conforming to the shape 117 of the slipper tool 110. The state where the softened (or molten) material 132 conforms to the shape 117 of the slipper tool 110 is illustrated as 132B in FIG. 1. In at least one embodiment, the material 132 conforms to the shape 117 of the slipper tool 110 not only by heat generated by the heater 134/134A, but also by mechanical means. Example mechanical means include, but are not limited to, rigid or semi-rigid metallic, plastic or other materials or contact devices; brush, bristle, whisker, or other flexible, finger-like contact devices; air, liquid, or other filled or unfilled bladder or membrane contact devices; pressure in the form of directed air, inert gas, or other gaseous or fluid material media that may be actively or passively heated or cooled or introduced at ambient temperature. In some embodiments, any of the described mechanical means may be implemented manually or automatically or by combination thereof. In at least one embodiment, the material 132 is additionally heated by heat generated by the internal heater of the slipper tool 110. For example, when the slipper tool 110 is received in a cradle at the external heater 113, the internal heater of the slipper tool 110 is automatically brought into contact with corresponding power terminals which provide electrical power for heating the slipper tool 110 under control by the controller 150.

After heating the slipper tool 110 for a predetermined period of time in the first heating stage with the first temperature T1 to ensure that the material 132 is softened and conforms to the shape 117 of the slipper tool 110, the heater 134/134A is switched to a second heating stage with a second temperature T2 higher than the first temperature T1. The change from the first heating stage to the second heating stage is illustrated by an arrow 136 (it should be noted that the arrow 136 does not indicate a physical movement of the heaters 134, 134A and the slipper tool 110). The second heating stage brings the material 132 into the molten state with a molding temperature at or above the melting temperature of the material 132 and suitable for the molding process. In at least one embodiment, the first temperature T1 is at or below the melting temperature of the material 132, and the second temperature T2 is at or above the melting temperature of the material 132.

The slipper tool 110 with the material 132 molten and conforming to the shape 117 of the slipper tool 110 therein is transferred by the transferring device 111 into the opened press 114, and the press 114 is closed. In at least one embodiment, the slipper tool 110 is transferred into the press 114 while the material 132 received in the slipper tool 110 is in a molten state and has a temperature higher than the melting temperature of the material 132. In the closed position of the press 114, the lower mold part 142 and upper mold part 144 are cooled, e.g., with chilled water. The material 132 is cooled from below by the lower mold part 142 via the slipper tool 110, and from above by direct contact with the upper mold part 144. The material 132 is cooled below its glass transition temperature (or otherwise suitable cure temperature) and assumes the shape of the molded product by the pressing and cooling action between the upper mold part (or mold tool) 144 and the slipper tool 110 in the press 114. In at least one embodiment, the molding process in the press 114 is performed without heating the material 132.

In at least one embodiment, the material 132 is heated in the press 114 in a first stage at a beginning of the molding process to maintain the material 132 at the molding temperature or to bring the temperature of the material 132 back to the molding temperature, to compensate for a temperature drop due to the transfer of the slipper tool 110 from the external heater 113 into the press 114 and/or due to the closing action of the press 114. In the first stage, the material 132, which was already in a molten state when transferred into the press 114, is in the molten state for a predetermined period of time while the molten material 132 is being pressed by the mold tool 144 against the surface 117 of the slipper tool 110. In a second, subsequent stage of the molding process, the slipper tool 110 and the material 132 are cooled down in the press 114 while the material 132 is being pressed by the mold tool 144 against the surface 117 of the slipper tool 110.

In some embodiments, while the product is being molded in the press 114, another set of material is prepared and heated on another slipper tool 120 at the work station 130B in a similar manner as described herein with respect to the slipper tool 110. When the molding process in the press 114 is finished, the slipper tool 110 is discharged from within the press 114 to the work station 130A (or a separate inspection and/or removal station) for inspection and/or product removal, and the slipper tool 120 with the heated, molten material 132 conforming to the shape of the slipper tool 120 is transferred into the press 114 for a subsequent molding process. The described operation is then repeated.

In one or more embodiments, the press 114 include more than one mold tools for molding more than one products, together with more than one slipper tools, at the same time. An example configuration is described with respect to FIG. 4.

FIG. 2 is a perspective view of a slipper tool 210 in accordance with some embodiments. In at least one embodiment, the slipper tool 210 corresponds to the slipper tool 110 or 120 described with respect to FIG. 1. The slipper tool 210 has a side 211 corresponding to the lower side of the slipper tool 110 described with respect to FIG. 1. The opposite side of the slipper tool 210 has a shape 217 corresponding to the shape 117 of the slipper tool 110 described with respect to FIG. 1. The shape of the side 211 of the slipper tool 210 conforms to the shape 217 on the side that receives the material 132. In at least one embodiment, this arrangement allows the slipper tool 210 to be added to a pre-existing press without major changes or redesign of the press as described herein.

A thickness 218 of the slipper tool 210 is, in one or more embodiments, from 1 to 5 mm. In at least one embodiment, the thickness 218 is uniform throughout the slipper tool 210. The thicker the slipper tool 210, the more heat is retained in the slipper tool 210 for ensuring that the material 132 retains the molten state and/or conforming in shape to the shape 217 while being transferred from the work station 130A into the press 114 and/or while the press 114 is being closed after such transfer. On the other hand, the more heat is retained in the slipper tool 210, the longer (and/or the stronger cooling action) it takes to cool down the slipper tool 210 and the material 132 therein in the press 114. In at least one embodiment, the thickness and/or the material (with its heat conductivity) of the slipper tool 210 is selected depending on various factors, including, but not limited to, characteristics of the material 132, configurations of the molded products etc. In at least one embodiment, the material of the slipper tool 210 is selected based on its thermal expansion and/or contraction, to maintain the shape of the slipper tool 210 despite repeated heating and cooling cycles. Example materials of the slipper tool 210 include, but are not limited to, Ni, steel, various metallic alloys, composites, or other suitable materials that meet coefficient of thermal expansion, cyclic rate, heat transfer and other process parameters corresponding to specific materials to be molded. The coefficient of thermal expansion and/or the coefficient of thermal conductivity (heat transfer) indicate how quickly the slipper tool becomes ready or reusable for a subsequent molding process. The cyclic rate indicates how many times the slipper tool is reusable before wearing out. In some embodiments, the cyclic rate of the slipper tool is determined by the material strength of the slipper tool. In at least one embodiment, the slipper tool 210 is formed from Ni by vapor deposition. In at least a further embodiment, the slipper tool 210 is formed from a metallic alloy, such as Invar.

In at least one embodiment, the slipper tool 210 is formed from a composite material. An example composite material is CF/BMI (carbon fiber/bismaleimide). Other composite materials are within the scope of various embodiments. A composite material, in one or more embodiments, is considered as a thermal insulator. When the slipper tool is formed from a thermal insulator in one or more embodiments, the raw material received in the slipper tool is directly heated by the external heater, e.g., by the upper heater 134A described with respect to FIG. 1, rather than indirectly through the slipper tool. Similarly, the heated and conforming raw material in or on the slipper tool is cooled directly in the press, e.g., by the mold tool 144, rather than indirectly through the slipper tool. In some embodiments, the thermal conductivity of the slipper tool ranges from 1.0 W/m° C. and below for a thermal insulator, such as CF/BMI, to 70 W/m° C. for a thermal conductor, such as Ni. In some embodiments, the coefficient of thermal expansion (CTE) of the slipper tool ranges from $13.3 \times 10^{-6}$ m/m° C. for a metallic material, such as Ni, to $1.0 \times 10^{-6}$ m/m° C. or lower for a composite material, such as CF/BMI.

FIG. 3A is a perspective view of a molding system 300 in accordance with some embodiments. The molding system 300 includes at least one slipper tool 310, at least one external heater 313 and a press 314. In some embodiments, the slipper tool 310, external heater 313 and press 314 correspond to the slipper tool 110, external heater 113 and press 114 described with respect to FIG. 1.

The external heater 313 comprises a lower heater 334 and an upper heater 334A. In some embodiments, the lower heater 334 and upper heater 334A correspond to the lower heater 134 and upper heater 134A described with respect to FIG. 1. The lower heater 334 includes a cradle 335 in which the slipper tool 310 is received when the slipper tool 310 and a raw material herein are being heated by the external heater 313.

The press 314 comprises a lower mold part 342 and an upper mold part 344. The lower mold part 342 includes a cradle 345 in which the slipper tool 310 is received when the slipper tool 310 and a raw material herein are received in the press 314. The press 314 further comprises a closing/opening device 346 for closing/opening the press 314. In some embodiments, the lower mold part 342, upper mold part 344 and closing/opening device 346 correspond to the lower mold part 142, upper mold part 144 and closing/opening device 146 described with respect to FIG. 1.

In the example configuration in FIG. 3A, the molding system 300 further comprises a heated rolling belt press 370. A belt conveyor 372 transfers a raw material 332 through the heated rolling belt press 370 which presses and/or pre-heats the raw material 332 before the raw material 332 is placed on the slipper tool 310. In at least one embodiment, the pre-heated raw material 332 remains in a solid state to facilitate transfer of the pre-heated raw material 332 to the slipper tool 310. In at least one embodiment, the heated rolling belt press 370 and/or the belt conveyor 372 is/are omitted.

Figure 3B:
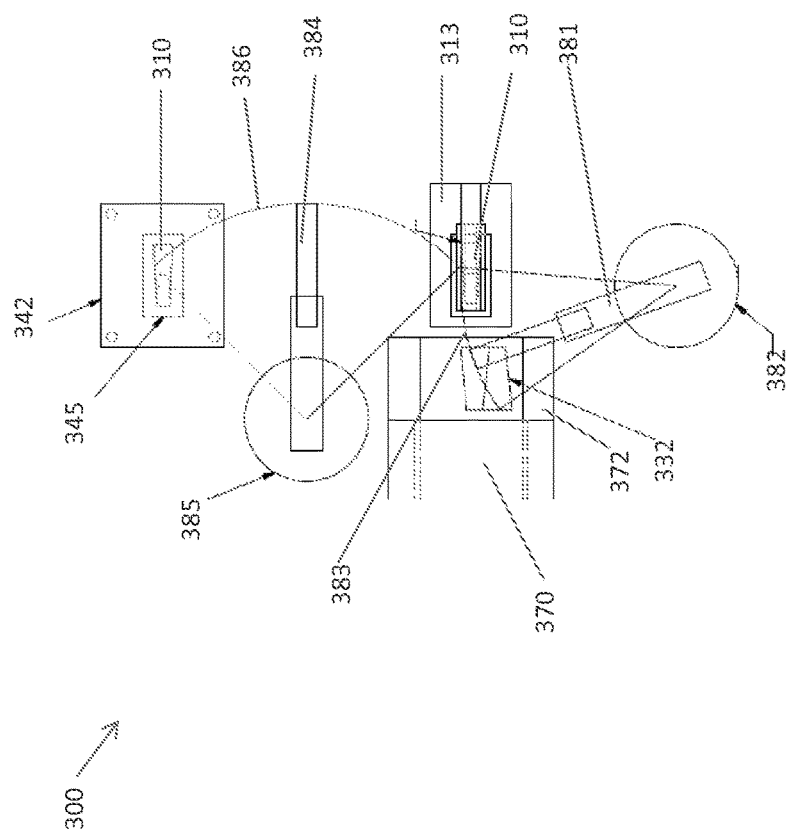
FIG. 3B is a plan view of the molding system in accordance with some embodiments.

FIG. 3B is a plan view of the molding system 300 in accordance with some embodiments. As shown in FIG. 3B, the molding system 300 further comprises a first robot hand 381 rotatable around a base 382 along a path 383 to transfer the raw material 332 from the belt conveyor 372 to the slipper tool 310 at the external heater 313. The molding system 300 further comprises a second robot hand 384 rotatable around a base 385 along a path 386 to transfer the slipper tool 310 with the heated, and shape conforming material 332 from the external heater 313 to the cradle 345 on the lower mold part 342 of the press 314. A further robot hand, or the robot hand 384, is configured to transfer the slipper tool 310 and the molded product upon completion of the molding process from the press 314 to an inspection or product removal station. In some embodiments, the robot hand 384 corresponds to the transferring devices 111, 112 described with respect to FIG. 1. Other devices for transferring the slipper tool to and from the press 314 and/or the external heater 313 are within the scope of various embodiments.

Figure 4:
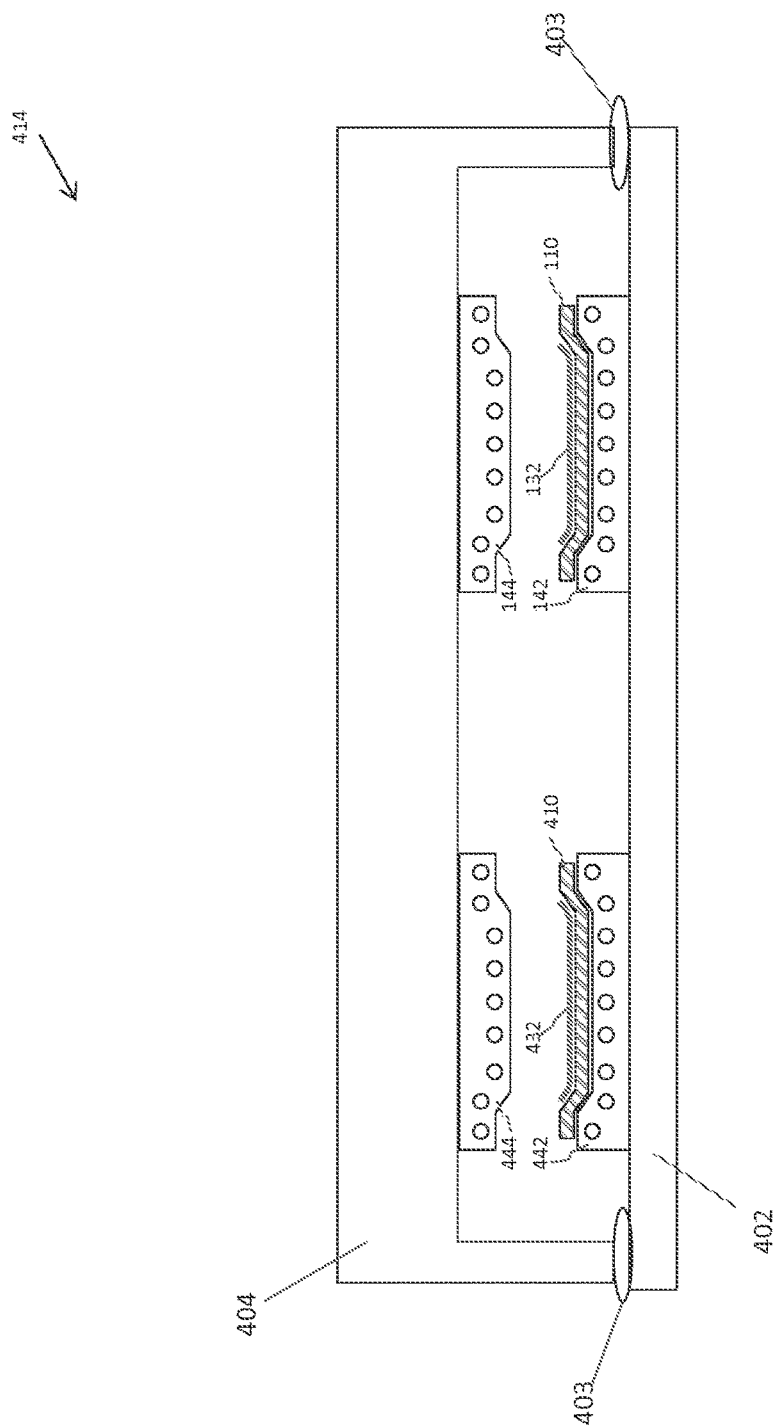
FIG. 4 is a schematic view of a press in a molding system in accordance with some embodiments.

FIG. 4 is a schematic view of a press 414 in a molding system in accordance with some embodiments. The press 414 comprises a first part 402 and a second part 404 moveable with respect to each other to open and close the press 400. The press 414 comprises a seal 403, e.g., a seal ring or a pressure seal, for sealing the first and second parts 402, 404 in the closed position of the press 414. Compared to the press 114 described with respect to FIG. 1, the press 414 comprises multiple lower mold parts 142, 442 arranged on the first part 402, and multiple corresponding upper mold parts or mold tools 144, 444 carried by the second part 404. The mold tools 144, 444 are configured to simultaneously mold multiple products with corresponding slipper tools 110, 410 received in the corresponding lower mold parts 142, 442. In at least one embodiment, similar or identical products are simultaneously molded in the press 414. For example, the mold tools 144, 444, the slipper tools 110, 410 and corresponding raw materials 132, 432 are configured/selected similarly or identically to mold products of similar or identical configurations. In at least one embodiment, different products are simultaneously molded in the press 414. For example, the mold tools 144, 444, the slipper tools 110, 410 or the corresponding raw materials 132, 432 are configured/selected differently to mold products of different configurations.

Figure 5:
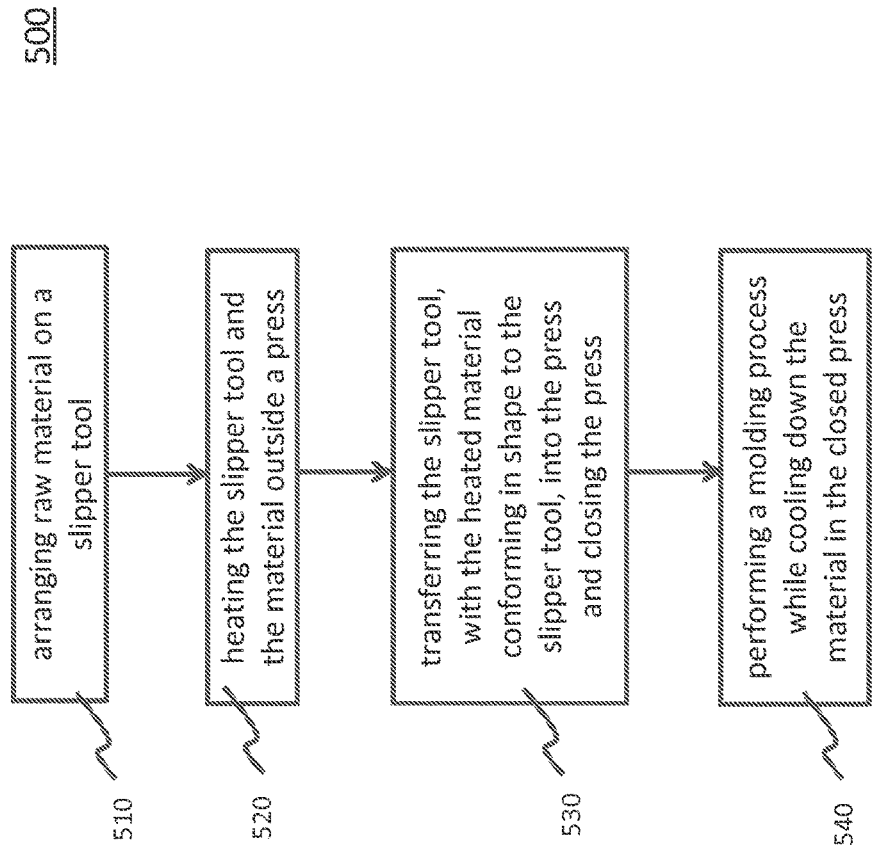
FIG. 5 is a flow chart of a method of molding a product in accordance with some embodiments.

FIG. 5 is a flow chart of a method 500 of molding a product in accordance with some embodiments.

At operation 510, a raw material is placed on a surface of a slipper tool. The surface of the slipper tool corresponds to a final molded surface of the product to be molded. For example, as described herein with respect to one or more of FIGS. 1-4, a raw material, such as 132, 332, 432, is placed on a surface, such as 117, 217, of a slipper tool, such as 110, 210, 310, 410.

At operation 520, the slipper tool and the material received therein are heated at an external heater outside a press. The material is heated to a state where the material is soften or molten and conforms in shape to the surface of the slipper tool. For example, as described herein with respect to one or more of FIGS. 1-4, the slipper tool, such as 110, 210, 310, 410, and the material, such as 132, 332, 432, are heated at an external heater, such as 113, 313, outside a press, such as 114, 314, 414. In some embodiments, the heating at the external heater is performed in at least two stages with the subsequent stage having a heating temperature higher than the first stage.

At operation 530, the slipper tool, with the heated material conforming in shape to the slipper tool, is transferred into the press and the press is closed. For example, as described herein with respect to one or more of FIGS. 1-4, the slipper tool, such as 110, 210, 310, 410, and the heated material, such as 132, 332, 432, conforming in shape, e.g., at 132B, to the slipper tool are transferred into the press, such as 114, 314, 414, and the press is closed.

At operation 540, a molding process is performed, while cooling down the material, in the closed press. In the molding process, a mold tool of the press presses the material against the surface of the slipper tool to mold the product. For example, as described herein with respect to one or more of FIGS. 1-4, the material, such as 132, 332, 432, conforming in shape to the slipper tool is pressed, while being cooled down, by a mold tool 144, 344, 444 against the surface of the corresponding slipper tool, such as 110, 210, 310, 410, thereby molding the product. Upon completion of the molding process, the slipper tool with the molded product therein are removed from the press to an inspection or product removal station.

The above methods include example operations, but they are not necessarily required to be performed in the order shown. Operations may be added, replaced, changed order, and/or eliminated as appropriate, in accordance with the spirit and scope of embodiments of the disclosure. Embodiments that combine different features and/or different embodiments are within the scope of the disclosure and will be apparent to those of ordinary skill in the art after reviewing this disclosure.

One or more of the following advantages is/are achievable in one or more embodiments.

A consideration in production manufacturing is often the inability or difficulty to handle the raw material during various stages of the converting process. Many advanced composite materials are soft, tacky, fragile, hot or a combination of one or more of these characteristics, immediately prior to being presented to the molding or otherwise final forming process. In some situations, mechanical grippers are inconsistent or disallowed and/or vacuum cups are not rated for higher process temperatures or complex geometries. The transfer of molten material to be molded in other approaches very often involves human operators with associated protection from high temperatures and possibly chemicals. Given that the allowed transfer time is measured in seconds, the result is often inconsistent part quality, production rate, and/or health risk in some situations.

The slipper tool in accordance with some embodiments eliminates the need to directly handle a hot, sticky and/or fragile material. The slipper tool in accordance with some embodiments also eliminates the need to heat a mold tool with a much higher mass in the case where the material to be molded is presented to the mold at a lower temperature, because the thin wall of the slipper tool enables rapid heating and cooling as compared to the mass of a typical complete mold tool.

In some embodiments, the slipper tool is heated before the material to be molded is placed thereon. In at least one embodiment, the material to be molded is presented at an elevated temperature that still allows handling of the material, for example, by a robot hand 381 and/or belt conveyor 372 as described with respect to FIGS. 3A-3B. The material will begin to form when placed on the heated slipper tool and additional heat energy is added to the material surface from above and/or from below in one or more embodiments. The slipper tool supports the unstable material to be molded as the slipper tool and material are automatically transferred into the mold tool for final forming. The slipper tool and final molded part are automatically removed from the mold tool and transferred to a subsequent process. As a result, one or more effects such as quick transfer and/or molding time, improved product quality and/or production rate, lower health risk is obtainable in at least one embodiment.

In at least one embodiment, a slipper tool is configured as an add-on to a pre-existing press without changes, or redesign, to the press.

In at least one embodiment, the molded product is left in the slipper tool outside the press for a predetermined time period for further cooling down, without an additional, active cooling mechanism. In at least one embodiment, the molded product and the slipper tool are placed on a cooling, receiving part similar to the lower mold part 142 but outside the press 114, and are further, actively cooled down by the cooling, receiving part.

In at least one embodiment, a temperature T1 in the first heating stage and a temperature T2 in the second heating stage for heating the slipper tool and the raw material 132 outside the press are selected depending on characteristics of the material 132. In at least one embodiment, the temperature T1 is at or closely below the melting temperature of the material 132, whereas the temperature T2 is at or above the melting temperature of the material 132. For example, the temperature T1 is in the range from 400-490° F., and temperature T2 is higher than 490° F. in one or more embodiments.

In an example, the material 132 includes Continuous-fiber-reinforced polymer (CFRP) Glass material, with the polymer matrix identified as PA6. The matched metal mold tool is configured to accommodate a removable slipper tool of a thickness of 1-5 mm. In at least one embodiment, the mold tool or press is shimmed to allow for varying thicknesses of the slipper tool. The material of the slipper tool is nickel, formed by the vapor deposition method and polished. The heat transfer coefficient of the nickel slipper tool is about 70 W/m° C., which permits quick heating and/or cooling in some embodiments, especially where heating and/or cooling of the material of the product to be molded occurs through the slipper tool. However, as described herein, slipper tools made of insulating materials, such as composites, are used in one or more embodiments where direct heating and/or cooling of the material of the product to be molded is primary and heating and/or cooling of the slipper tool is secondary. The PA6/Glass material is placed in the slipper tool outside the mold tool or press. The material and the slipper tool enters an oven (e.g., an external heater) and are heated at about 520° F. The material softens and is formed into the shape of the slipper tool. The material and the slipper tool reach about 520° F. The formed material and/or slipper tool are automatically transferred into the male/female die set (e.g., lower and upper mold parts or mold tools) of the press in which the material is pressed and cooled down. After the material and/or slipper tool reach 200° F. during the cooling cycle with the chilled mold tools in the press, the molded part and the slipper tool are automatically removed from the press. In at least one embodiment, the chilled mold tools have temperature of about 40° F. during the molding process. After automatic removal, the molded part is automatically removed from the slipper tool and stacked. The slipper tool is returned to the layup station for layup and reheating.

In a further example, air heating from the top is used for about 4 seconds to heat a slipper tool of about 0.125 inch (3.175 mm) in thickness to 500° F. from 200° F. Air heating may be implemented with or without the raw material in place on or in the slipper tool, or the air heating may be introduced incrementally; first to the slipper tool directly, followed by heating of the raw material as the raw material is introduced to the process cycle. An alternative heating source includes gas flame contoured to suit the shape of the slipper tool, from the bottom side of the slipper tool. The temperature of the air heat is at about 1500° F. in some embodiments, and the temperature of the gas heat is at about 3500° F. in some embodiments. As such, gas heat is superior with respect to time in at least one embodiment.

In at least one embodiment, preheating the slipper tool (without the raw material in or on the slipper tool) is advantageous where the raw material is thick (e.g., including several layers) and/or where a heater for heating the raw material through the slipper tool is not provided or not used. For example, in the example configuration in FIG. 3A, the slipper tool 310 is placed on a thermally insulating cradle 335, and is pre-heated by the upper heater 334A. The raw material 332 is then arranged over or in the pre-heated slipper tool 310, and the upper heater 334A directly heats the upper side of the raw material 332 whereas the lower side of the raw material 332 is heated at least partially by heat retained in the preheated slipper tool 310. In another example, the slipper tool 310 is pre-heated by one or both of the lower heater 334 and the upper heater 334A, and after the raw material 332 is added over or in the slipper tool 310, both of the lower heater 334 and the upper heater 334A are used to heat the raw material 332 and the slipper tool 310 for quick and uniform transform of the raw material 332.

Figure 6:
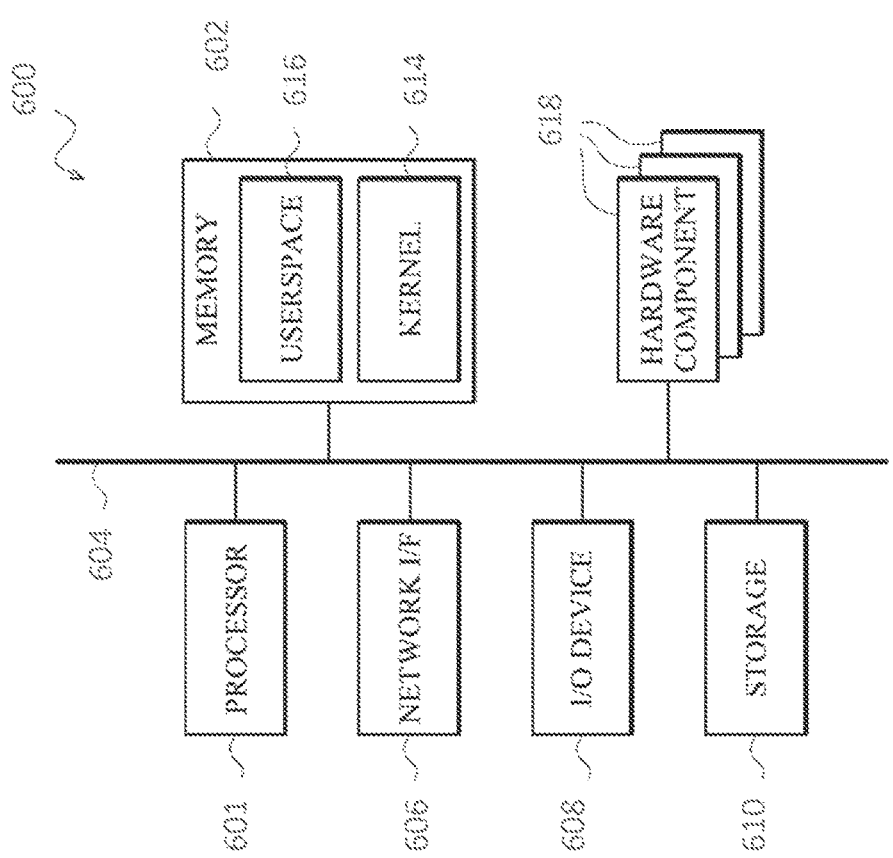
FIG. 6 is a block diagram of a computer system in accordance with some embodiments.

FIG. 6 is a block diagram of a computer system 600 in accordance with some embodiments. One or more of the functions and/or operations described with respect to FIGS. 1-5 (for example, those described with respect to the controller 150 in FIG. 1) is/are realized in some embodiments by one or more computer systems 600 of FIG. 6. The system 600 comprises at least one processor 601, a memory 602, a network interface (I/F) 606, a storage 610, an input/output (I/O) device 608 communicatively coupled via a bus 604 or other interconnection communication mechanism.

The memory 602 comprises, in some embodiments, a random access memory (RAM) and/or other dynamic storage device and/or read only memory (ROM) and/or other static storage device, coupled to the bus 604 for storing data and/or instructions to be executed by the processor 601, e.g., kernel 614, userspace 616, portions of the kernel and/or the userspace, and components thereof. The memory 602 is also used, in some embodiments, for storing temporary variables or other intermediate information during execution of instructions to be executed by the processor 601.

In some embodiments, a storage device 610, such as a magnetic disk or optical disk, is coupled to the bus 604 for storing data and/or instructions, e.g., kernel 614, userspace 616, etc. The I/O device 608 comprises an input device, an output device and/or a combined input/output device for enabling user interaction with the system 600. An input device comprises, for example, a keyboard, keypad, mouse, trackball, trackpad, and/or cursor direction keys for communicating information and commands to the processor 601. An output device comprises, for example, a display, a printer, a voice synthesizer, etc. for communicating information to a user.

In some embodiments, one or more of the functions and/or operations described with respect to FIGS. 1-5 (for example, those described with respect to the controller 150 in FIG. 1) is/are realized by the processor 601, which is programmed for performing such operations and/or functionality. In some embodiments, the processor 601 is configured as specifically configured hardware (e.g., one or more application specific integrated circuits (ASICs)). One or more of the memory 602, the I/F 606, the storage 610, the I/O device 608, the hardware components 618, and the bus 604 is/are operable to receive instructions, data, and/or other parameters for processing by the processor 601. The I/F 606, in one or more embodiments, includes one or more ports, connectors, cables, hardware modules for wireless communication and the like, for connection to and/or communication with one or more of the components of the molding system, such as the press, heater(s) and slipper tool(s) described with respect to FIG. 1.

In some embodiments, the operations and/or functionality are realized as functions of a program stored in a non-transitory computer readable recording medium. In at least one embodiment, the operations and/or functionality are realized as functions of a program, such as a set of executable instructions, stored in memory 602. Examples of a non-transitory computer readable recording medium include, but are not limited to, external/removable and/or internal/built-in storage or memory unit, e.g., one or more of an optical disk, such as a DVD, a magnetic disk, such as a hard disk, a semiconductor memory, such as a ROM, a RAM, a memory card, and the like.

In some embodiments, a system for molding products comprises a press, an external heater and a slipper tool. The press is moveable between an open position, in which a mold space in the press is accessible from outside, and a closed position, in which the mold space in the press is closed. The press comprises a mold tool. The external heater is located outside the press. The slipper tool is moveable between the external heater and the mold space when the press is in the open position. The slipper tool comprises a surface configured to receive thereon a material of a product to be molded. The surface corresponds to a molded surface of the product. When the slipper tool is at the external heater, the external heater is configured to heat the material received on the slipper tool. When the slipper tool is in the mold space and the press is in the closed position, the mold tool is configured to press the heated material against the surface of the slipper tool to mold the product.

In some embodiments, a method of molding a product comprises arranging a material of the product to be molded on a surface of a slipper tool, the surface corresponding to a molded surface of the product. The method further comprises heating, at an external heater outside a press, the slipper tool and the material received therein to a state where the material is soften or molten and conforms in shape to the surface of the slipper tool. The method then comprises transferring the slipper tool, with the heated material conforming in shape to the surface of the slipper tool, into the press and closing the press. The method further comprises performing, in the closed press, a molding process in which a mold tool of the press presses, while cooling down, the heated material against the surface of the slipper tool to mold the product.

In some embodiments, a slipper tool for molding a product in a system is provided. The system comprises a press and an external heater outside the press. The slipper tool comprises first and second surfaces. The first surface corresponds to a molded surface of the product to be molded, and is configured to receive thereon a material of the product to be molded. The second surface is opposite, and matches in shape, to the first surface. The slipper tool comprises a metal, and has a uniform thickness in a range of 1-5 mm.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

The invention claimed is:

1. A system for molding products, said system comprising:
    a press moveable between an open position, in which a mold space in the press is accessible from outside, and a closed position, in which the mold space in the press is closed, the press comprising a mold tool;
    an external heater located outside the press; and
    a slipper tool moveable between the external heater and the mold space when the press is in the open position, the slipper tool comprising a surface configured to receive thereon a material of a product to be molded, said surface corresponding to a molded surface of the product,
    wherein
    when the slipper tool is at the external heater, the external heater is configured to heat the material received on the slipper tool,
    when the slipper tool is in the mold space and the press is in the closed position, the mold tool is configured to press the heated material against the surface of the slipper tool to mold the product, and
    the external heater comprises
        a first heater configured to heat the slipper tool from a side opposite to the surface on which the material is to be received, and
        a second heater configured to directly heat the material from a side of said surface.

2. The system of claim 1, further comprising:
    a controller coupled to the press and the external heater,
    wherein the controller is configured to
        when the slipper tool is at the external heater, cause the external heater to heat the material received on the slipper tool to a state where the material conforms in shape to the surface of the slipper tool, and then
        cause the slipper tool with the heated material conforming in shape to the surface of the slipper tool to be transferred to the mold space, and cause the press to move to the closed position to mold the product.

3. The system of claim 2, wherein
the controller is further configured to, when the slipper tool is in the mold space and the press is in the closed position, cause the press to cool down, without heating, the slipper tool and the material being molded.

4. The system of claim 1, wherein the external heater further comprises
a cradle configured to receive the slipper tool while the slipper tool is at and being heated by the external heater.

5. The system of claim 1, wherein
the press comprises a plurality of mold tools, and
the system comprises a plurality of slipper tools each corresponding to one of the mold tools in the press for simultaneously molding multiple products by the corresponding mold tools and slipper tools.

6. The system of claim 1, further comprising at least one of
a demolding station configured to receive the slipper tool and the molded product from the press after molding, or
a further external heater configured to heat a further slipper tool with a material of a further product to be molded.

7. The system of claim 1, wherein
the press comprises a upper mold part and a lower mold part,
the upper mold part and the lower mold part are movable relative to each other between the open position and the closed position where the upper mold part and the lower mold part are coupled to each other to close the mold space,
the upper mold part comprises the mold tool, and
the lower mold part comprises a cradle configured to receive the slipper tool.

8. The system of claim 7, wherein
at least one of the upper mold part or the lower mold part comprises a cooling device configured to cool down the slipper tool and the material being molded.

9. The system of claim 1, wherein
the slipper tool has a further surface opposite, and matching in shape, to the surface for receiving the material of the product to be molded,
the slipper tool comprises a metal, and
the slipper tool has a uniform thickness in a range of 1-5 mm.

10. A method of molding a product, said method comprising
arranging a material of the product to be molded on a surface of a slipper tool, the surface corresponding to a molded surface of the product;
heating, at an external heater outside a press, the slipper tool and the material received therein to a state where the material is soften or molten and conforms in shape to the surface of the slipper tool; then
transferring the slipper tool, with the heated material conforming in shape to the surface of the slipper tool, into the press and closing the press; and
performing, in the closed press, a molding process in which a mold tool of the press presses, while cooling down, the heated material against the surface of the slipper tool to mold the product,
wherein the external heater comprises
a first heater, wherein the first heater heats the slipper tool from a side opposite to the surface on which the material is to be received, and
a second heater, wherein the second heater directly heats the material from a side of said surface.

11. The method of claim 10, wherein said heating comprises
a first heating stage at a first temperature, said first heating stage being performed for a first period sufficient for the material to at least soften and become conforming in shape to the surface of the slipper tool, and
a second, subsequent heating stage at a second temperature higher than the first temperature, said second heating stage being performed for a second period sufficient to bring the material to a molten state.

12. The method of claim 11, wherein
the first temperature is at or below a melting temperature of the material, and
the second temperature is at or above the melting temperature of the material.

13. The method of claim 10, wherein
the slipper tool is transferred into the press while the material received in the slipper tool is in a molten state and has a temperature higher than a melting temperature of the material.

14. The method of claim 10, wherein
said molding process is performed without heating the slipper tool and the material in the press.

15. The method of claim 10, wherein said molding process comprises
a first stage where the slipper tool and the material are heated in the press to maintain the material, which was already in a molten state when transferred into the press, in the molten state for a predetermined period of time while the molten material is being pressed by the mold tool against the surface of the slipper tool, and
a second, subsequent stage where the slipper tool and the material are cooled down in the press while the material is being pressed by the mold tool against the surface of the slipper tool.

16. The method of claim 10, further comprising
while performing the molding process of the product in the press, heating a further slipper tool with a material of a further product to be molded thereon;
removing the slipper tool with the molded product from the press; and
transferring the further slipper tool with the heated material into the press and performing a further molding process to mold the further product.

17. A slipper tool for molding a product in a system, the system comprising a press and an external heater outside the press, the slipper tool comprising:
a first surface corresponding to a molded surface of the product to be molded, said first surface configured to receive thereon a material of the product to be molded; and
a second surface opposite, and matching in shape, to the first surface,
wherein
the slipper tool comprises a metal, and
the slipper tool has a uniform thickness in a range of 1-5 mm.

18. The slipper tool of claim 17, wherein
the material of the slipper tool comprises vapor-deposited Ni.

19. The slipper tool of claim 17, further comprising:
an internal resistive heating element.

20. The system of claim 1, wherein the first heater is a lower heater, the second heater is an upper heater upwardly spaced in a vertical direction from the lower heater by a spacing in which the slipper tool is receivable, the surface on which the material is to be received is an upper surface of the slipper tool, the slipper tool further has a lower surface opposite to the upper surface in the vertical direction, and when the slipper tool with the material on the upper surface is received in the spacing between the lower and upper heaters, the lower heater is configured to heat the slipper tool from below the lower surface of the slipper tool and the upper heater is configured to directly heat the material on the upper surface of the slipper tool from above.

\* \* \* \* \*